(12) United States Patent
Nishimura et al.

(10) Patent No.: US 9,734,240 B2
(45) Date of Patent: Aug. 15, 2017

(54) MEDIUM, METHOD, AND APPARATUS

(71) Applicant: FUJITSU LIMITED, Kawasaki-shi, Kanagawa (JP)

(72) Inventors: Toshihiro Nishimura, Hachioji (JP); Toshiya Hanamori, Shimizu (JP); Junji Shimaoka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 14/509,139

(22) Filed: Oct. 8, 2014

(65) Prior Publication Data

US 2015/0120765 A1     Apr. 30, 2015

(30) Foreign Application Priority Data

Oct. 28, 2013   (JP) .................. 2013-223724

(51) Int. Cl.
*G06F 17/30*     (2006.01)

(52) U.S. Cl.
CPC .. *G06F 17/30699* (2013.01); *G06F 17/30076* (2013.01); *G06F 17/30091* (2013.01); *G06F 17/30507* (2013.01)

(58) Field of Classification Search
CPC ........... G06F 17/30424; G06F 17/3076; G06F 17/30091; G06F 17/30507; G06F 17/30699; G06F 17/30076
USPC ................................. 707/600–899
See application file for complete search history.

(56) References Cited

U.S. PATENT DOCUMENTS

| | | | |
|---|---|---|---|
| 8,751,499 B1 * | 6/2014 | Carasso | G06F 17/30705 706/47 |
| 2011/0040746 A1 | 2/2011 | Handa et al. | |
| 2012/0084317 A1 | 4/2012 | Sakamoto | |
| 2012/0124594 A1 | 5/2012 | Mikami | |
| 2012/0144251 A1 | 6/2012 | Carey et al. | |

FOREIGN PATENT DOCUMENTS

| | | |
|---|---|---|
| JP | 5-334359 | 12/1993 |
| JP | 2011-39818 | 2/2011 |
| JP | 2012-79240 | 4/2012 |
| JP | 2012-123783 | 6/2012 |
| JP | 2012-212227 | 11/2012 |
| WO | WO 2011/010711 | 1/2011 |

OTHER PUBLICATIONS

Japanese Office Action dated May 9, 2017 in corresponding Japanese Patent Application No. 2013-223724, 3 pages.

* cited by examiner

*Primary Examiner* — Isaac M Woo

(74) *Attorney, Agent, or Firm* — Staas & Halsey LLP

(57) ABSTRACT

A non-transitory computer-readable medium including a program, which when executed by a computer, causes the computer to execute a process including collecting data item indicating specific criteria relating to a plurality of rules for gradually filtering a received data; and selectively extracting specific data relating to the collected data item indicating the specific criteria from content of the received data.

4 Claims, 20 Drawing Sheets

FIG. 3

```
RULE 1
insert into FilteredEvent1 select* from Event1 where 1b > 100
RULE 2
insert into FilteredEvent2 select* from Event2 where 2b < 100
RULE 3
insert into ActionEvent select e1.1a as 1a, e1.1c as 1c, e2.2d as 2d, e2.2e as 2e
from FilteredEvent1 as e1, FilteredEvent2 as e2 where e1.1a = e2.2a
```

FIG. 4

| RULE | DETERMINATION PROPERTY | PROPERTY OF INPUT EVENT TO BE BASE OF DETERMINATION PROPERTY | FINAL OUTPUT PROPERTY | PROPERTY OF INPUT EVENT TO BE BASE OF FINAL OUTPUT PROPERTY |
|---|---|---|---|---|
| RULE 1 | (Event1)1b | (Event1)1b | – | – |
| RULE 2 | (Event2)2b | (Event2)2b | – | – |
| RULE 3 | (FilteredEvent1)1a (FilteredEvent2)2a | (Event1)1a (Event2)2a | (ActionEvent)1a (ActionEvent)1c (ActionEvent)2d (ActionEvent)2e | (Event1)1a (Event1)1c (Event2)2d (Event2)2e |

FIG. 6

```
RULE 1
insert into FilteredEvent1 select* from Event1 where 1b > 100
RULE 2
insert into FilteredEvent2 select* from Event2 where 2b < 100
RULE 3
insert into ActionEvent select e1.1a as 1a, e1.1c as 1c, e2.2d as 2d, e2.2e as 2e
from FilteredEvent1 as e1, FilteredEvent2 as e2 where e1.1a = e2.2a
```

| RULE | from PHRASE | INPUT EVENT (STREAM) | ALIAS OF INPUT EVENT (STREAM) |
|---|---|---|---|
| RULE 1 | from Event1 | Event1 | - |
| RULE 2 | from Event2 | Event2 | - |
| RULE 3 | from FIlteredEvent1 as e1, FilteredEvent2 as e2 | FilteredEvent1, FilteredEvent2 | e1, e2 |

FIG. 7

RULE 1
insert into FilteredEvent1 select* from Event1 where 1b > 100
RULE 2
insert into FilteredEvent2 select* from Event2 where 2b < 100
RULE 3
insert into ActionEvent select e1.1a as 1a, e1.1c as 1c, e2.2d as 2d, e2.2e as 2e from FilteredEvent1 as e1, FilteredEvent2 as e2 where e1.1a = e2.2a

| RULE | insert into PHRASE | OUTPUT EVENT (STREAM) |
|---|---|---|
| RULE 1 | insert into FilteredEvent1 | FilteredEvent1 |
| RULE 2 | insert into FilteredEvent2 | FilteredEvent2 |
| RULE 3 | insert into ActionEvent | ActionEvent |

FIG. 8

```
RULE 1
insert into FilteredEvent1 select* from Event1 where 1b > 100
RULE 2
insert into FilteredEvent2 select* from Event2 where 2b < 100
RULE 3
insert into ActionEvent select e1.1a as 1a, e1.1c as 1c, e2.2d as 2d, e2.2e as 2e
from FilteredEvent1 as e1, FilteredEvent2 as e2 where e1.1a = e2.2a
```

| RULE | select PHRASE | OUTPUT PROPERTY | PROPERTY TO BE BASE OF OUTPUT | PROPERTY TO BE BASE OF OUTPUT |
|---|---|---|---|---|
| RULE 1 | select* | (ALL PROPERTIES OF INPUT EVENT) 1a, 1b, 1c, 1d, 1e | (ALL PROPERTIES OF INPUT EVENT) 1a, 1b, 1c, 1d, 1e | 1a, 1b, 1c, 1d, 1e (ALL ARE Event1) |
| RULE2 | select* | (ALL PROPERTIES OF INPUT EVENT) 2a, 2b, 2c, 2d, 2e | (ALL PROPERTIES OF INPUT EVENT) 2a, 2b, 2c, 2d, 2e | 2a, 2b, 2c, 2d, 2e (ALL ARE Event2) |
| RULE3 | select e1.1a as 1a, e1.1c as 1c, e2.2d as 2d, e2.2e as 2e | 1a, 1c, 2d, 2e | e1.1a, e1.1c, e2.2d, e2.2e | 1a (FilteredEvent1), 1c (FilteredEvent1), 2d (FilteredEvent2), 2e (FilteredEvent2) |

FIG. 9

| RULE | INPUT EVENT (STREAM) | PROPERTY OF INPUT EVENT | PROPERTY OF OUTPUT EVENT | OUTPUT EVENT (STREAM) |
|---|---|---|---|---|
| RULE 1 | Event1 | 1a,<br>1b,<br>1c,<br>1d,<br>1e | →1a,<br>→1b,<br>→1c,<br>→1d,<br>→1e | FilteredEvent1 |
| RULE 2 | Event2 | 2a,<br>2b,<br>2c,<br>2d,<br>2e | →2a,<br>→2b,<br>→2c,<br>→2d,<br>2e | FilteredEvent2 |
| RULE 3 | FilteredEvent1,<br><br>FilteredEvent2 | 1a,<br>1b,<br>1c,<br>1d,<br>1e<br>2a,<br>2b,<br>2c,<br>2d,<br>2e | →1a,<br><br>→1c,<br><br><br><br><br><br>→2d,<br>→2e | ActionEvent |

FIG. 10

```
RULE 1
insert into FilteredEvent1 select* from Event1 where 1b > 100
RULE 2
insert into FilteredEvent2 select* from Event2 where 2b < 100
RULE 3
insert into ActionEvent select e1.1a as 1a, e1.1c as 1c, e2.2d as 2d, e2.2e as 2e
from FilteredEvent1 as e1, FilteredEvent2 as e2 where e1.1a = e2.2a
```

⇩

| RULE | USED SECTION OF PROPERTY (where PHRASE OR THE LIKE) | USE PROPERTY | PROPERTY + EVENT |
|---|---|---|---|
| RULE 1 | where 1b > 100 | 1b | 1b (Event1) |
| RULE 2 | where 2b < 100 | 2b | 2b (Event2) |
| RULE 3 | where e1.1a = e2.2a | 1a (e1) ⟶ 2a (e2) ⟶ | 1a (FilteredEvent1), 2a (FilteredEvent2) |

FIG. 11

| RULE | INPUT EVENT (STREAM) | PROPERTY OF INPUT EVENT | PROPERTY OF OUTPUT EVENT | OUTPUT EVENT (STREAM) |
|---|---|---|---|---|
| RULE 1 | Event1 | 1a, 1b, 1c, 1d, 1e | 1a, 1b, 1c, 1d, 1e | FilteredEvent1 |
| RULE 2 | Event2 | 2a, 2b, 2c, 2d, 2e | 2a, 2b, 2c, 2d, 2e | FilteredEvent2  PROPERTIES USED IN DETERMINATION |
| RULE 3 | FilteredEvent1, FilteredEvent2 | 1a, 1b, 1c, 1d, 1e  2a, 2b, 2c, 2d, 2e | 1a, 1c,  2d, 2e | ActionEvent |

FIG. 12

```
RULE 1
insert into FilteredEvent1 select* from Event1 where 1b > 100
RULE 2
insert into FilteredEvent2 select* from Event2 where 2b < 100
RULE 3
insert into ActionEvent select e1.1a as 1a, e1.1c as 1c, e2.2d as 2d, e2.2e as 2e
from FilteredEvent1 as e1, FilteredEvent2 as e2 where e1.1a = e2.2a
```

| RULE | select PHRASE | OUTPUT PROPERTY (IN THE CASE OF *, ALL PROPERTIES OF INPUT EVENT. IN THE CASE OF PROPERTY WITH NO ALIAS, THE PROPERTY. IN THE CASE OF PROPERTY WITH ALIAS, THE ALIAS) | PROPERTY TO BE BASE OF OUTPUT (IN THE CASE OF *, ALL PROPERTIES OF INPUT EVENT. OTHERWISE, SPECIFIED SECTION OF PROPERTIES) | PROPERTY TO BE BASE OF OUTPUT (INCLUDING EVENT NAME) |
|---|---|---|---|---|
| RULE 1 | select* | (ALL PROPERTIES OF INPUT EVENT) 1a, 1b, 1c, 1d, 1e | (ALL PROPERTIES OF INPUT EVENT) 1a, 1b, 1c, 1d, 1e | 1a, 1b, 1c, 1d, 1e (ALL ARE Event1) |
| RULE 2 | select* | (ALL PROPERTIES OF INPUT EVENT) 2a, 2b, 2c, 2d, 2e | (ALL PROPERTIES OF INPUT EVENT) 2a, 2b, 2c, 2d, 2e | 1a, 1b, 1c, 1d, 1e (ALL ARE Event2) |
| RULE 3 | select e1.1a as 1a, e1.1c as 1c, e2.2d as 2d, e2.2e as 2e | 1a (ActionEvent), 1c (ActionEvent), 2d (ActionEvent), 2e (ActionEvent) | e1.1a, e1.1c, e2.2d, e2.2e | 1a (FilteredEvent1), 1c (FilteredEvent1), 2d (FilteredEvent2), 2e (FilteredEvent2) |

MEDIUM, METHOD, AND APPARATUS

CROSS-REFERENCE TO RELATED APPLICATION

This application is based upon and claims the benefit of priority from the prior Japanese Patent Application No. 2013-223724 filed on Oct. 28, 2013, the entire contents of which are incorporated herein by reference.

FIELD

The embodiments discussed herein are related to a medium, a method, and an apparatus.

BACKGROUND

In recent years, complex event processing (CEP) is known as a technique to process data collected one after another from various objects. Although the complex event processing may be referred to as event stream processing (ESP), here, the complex event processing is collectively referred to as CEP which includes the ESP.

In the complex event processing, data of various data items included in received data are processed according to a set rule, and a result according to the rule is outputted. The data item is also referred to as a property. For example, in the complex event processing, data of various properties included in received data are filtered according to a rule and outputted. Further, in the complex event processing, a plurality of rules may be set and processing may be performed according to the rules in stages.

Japanese Laid-open Patent Publication No. 2012-212227 is an example of related art.

SUMMARY

According to an aspect of the invention, a non-transitory computer-readable medium including a program, which when executed by a computer, causes the computer to execute a process including collecting data item indicating specific criteria relating to a plurality of rules for gradually filtering a received data; and selectively extracting specific data relating to the collected data item indicating the specific criteria from content of the received data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data configuration of filter condition data;

FIG. 4 is a diagram illustrating an example of a data configuration of use property data;

FIG. 6 is a diagram for explaining a flow of extracting an input event;

FIG. 7 is a diagram for explaining a flow of extracting an output event;

FIG. 8 is a diagram for explaining a flow of extracting a property to be included in an output event;

FIG. 9 is a diagram for explaining a correspondence relationship of properties between rules;

FIG. 10 is a diagram for explaining a flow of extracting properties used for determination;

FIG. 11 is a diagram for explaining a flow of identifying input event properties for properties used for determination;

FIG. 12 is a diagram for explaining a flow of extracting properties used for output;

DESCRIPTION OF EMBODIMENTS

First, the study of the inventors will be described. When a plurality of rules are set and processing is performed in stages, the rule in each stage is set so that data of property used by a rule in the subsequent stage is extracted. Therefore, if data of property used by a rule in a latter stage is changed, the rule of a former stage has to be changed so that the changed data of property is extracted, so it is troublesome. Therefore, for example, the rules are set so that data of all properties of the received data are extracted.

However, if the rules are set so that data of all properties of the received data are extracted, even data of unnecessary property is extracted. If such data of unnecessary property is extracted, resources are consumed to save and process the data of unnecessary property.

According to the embodiments described below, the consumption of resources is suppressed.

Hereinafter, the embodiments will be described in detail based on the drawings. The embodiments do not limit the present disclosure. The embodiments can be appropriated combined in a range where processing contents are not inconsistent with each other.

First Embodiment

Figure 1:
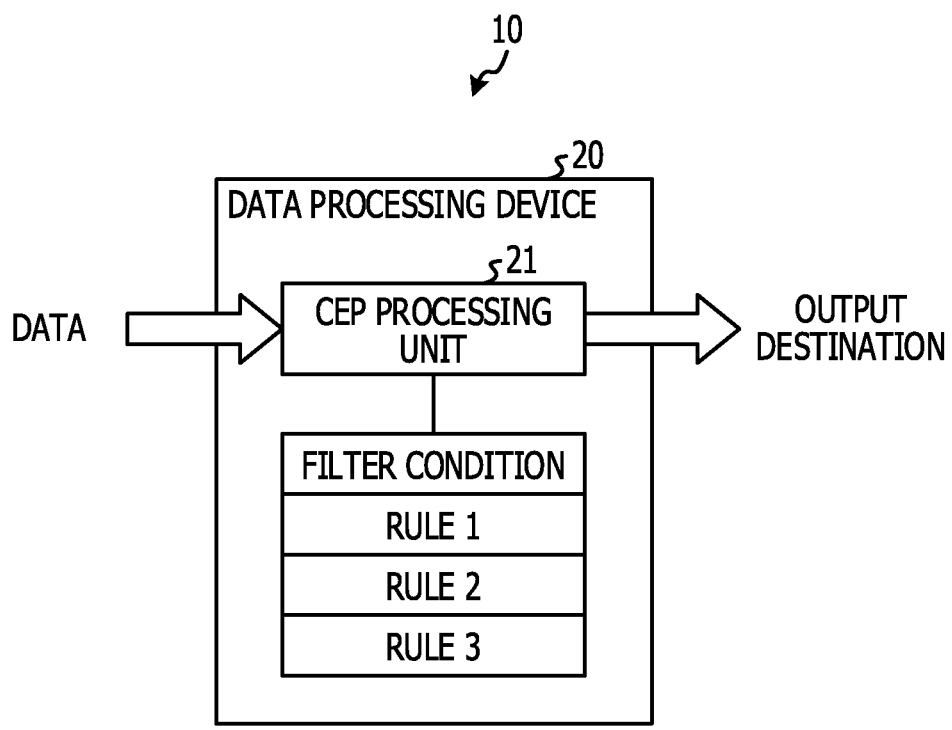
FIG. 1 is a diagram illustrating an example of a schematic configuration of a CEP system.

A data processing device according to a first embodiment will be described. FIG. 1 is a diagram illustrating an example of a schematic configuration of a CEP system. The CEP system 10 includes a data processing device 20.

The data processing device 20 is a physical server that performs complex event processing and. For example, the data processing device 20 is a server computer installed in a data center and a company. In the data processing device 20, a CEP processing unit 21 operates. The CEP processing unit 21 is software that realizes the complex event processing. For example, there is Esper as the software that realizes the complex event processing. Although in the example of FIG. 1, a case in which there is one data processing device 20 is illustrated, the disclosed system is not limited to this, but there may be two or more data processing devices 20 to distribute processing. Although in the example of FIG. 1, a case in which the CEP processing unit 21 described later operates on the data processing device 20 is illustrated, the CEP processing unit 21 may operates on one or more VMs (Virtual Machines) by causing the VMs to operate in the data processing device 20.

The data processing device 20 stores a filter condition (criteria) that filters data. In the example of FIG. 1, the data processing device 20 stores rules 1 to 3 as the filter condition.

Data is delivered to the data processing device 20 as an event from various objects. For example, the data processing device 20 is connected to a network not illustrated in the drawings and data of event including data of various properties of event is delivered to the data processing device 20 from various objects through the network. The property indicates an item of data such as an attribute of data. In data of property, data of attribute of each property is stored. The data processing device 20 processes data of events received from various objects according to a set rule and outputs a result according to the rule to an output destination.

Figure 2:
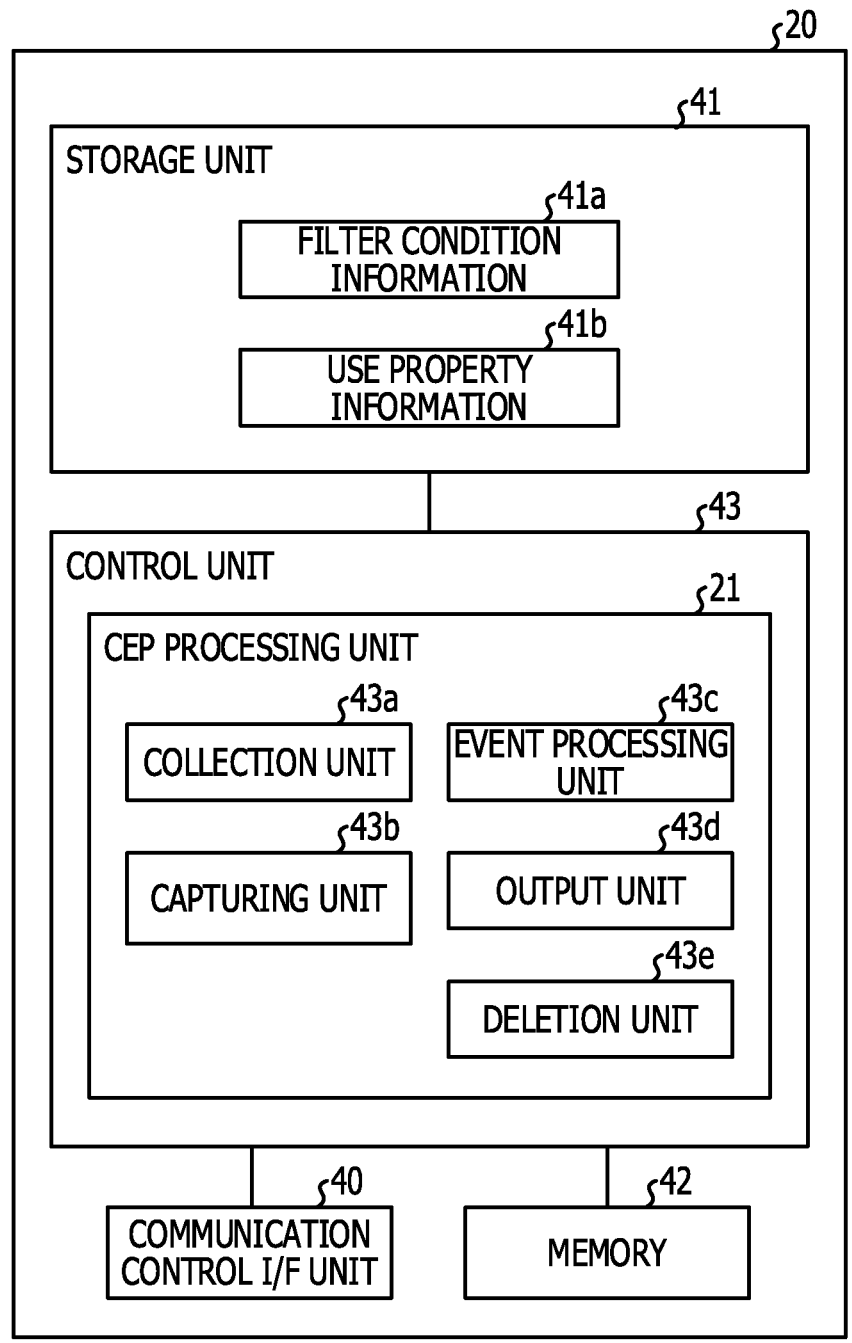
FIG. 2 is a diagram illustrating an example of a functional configuration of a data processing device.

Next, a more detailed configuration of the data processing device 20 will be described with reference to FIG. 2. FIG. 2 is a diagram illustrating an example of a functional configuration of the data processing device. As illustrated in FIG. 2, the data processing device 20 includes a communication control I/F (interface) unit 40, a storage unit 41, a memory 42, and a control unit 43.

The communication control I/F unit 40 is an interface that includes at least one port and controls communication with a network. The communication control I/F unit 40 receives data of event distributed from various objects through the network. Further, the communication control I/F unit 40 outputs information indicating a result of filtering to an output destination.

The storage unit 41 is a storage device such as a hard disk and an optical disk. The storage unit 41 may be a data-rewritable non-volatile memory such as a flash memory. The storage unit 41 stores various information. For example, the storage unit 41 stores an operating system (OS) executed by the control unit 43 and a program for performing various processing such as the complex event processing. Further, the storage unit 41 stores various data used to execute a program executed by the control unit 43. For example, the storage unit 41 stores filter condition information 41a and use property information 41b.

The filter condition information 41a is data storing a rule indicating a condition to filter data. The rule is set by, for example, an administrator or a developer of the system. Here, there are various description formats of the rule used in the complex event processing. In the present embodiment, an example is used in which the rule is described in an event description language based on Structured Query Language (SQL). However, it is not limited to this.

FIG. 3 is a diagram illustrating an example of a data configuration of filter condition data. As illustrated in FIG. 3, three filter conditions, which are rules 1 to 3, are stored in the filter condition information 41a. In the event processing language based on SQL, in the same manner as in SQL, the rule includes an insert into phrase, a select phrase, a from phrase, a where phrase, a group by phrase, and an order by phrase.

The insert into phrase is a section that specifies a name of an output event when data matching the rule is outputted as an event. The select phrase is a section that specifies a property to be data of the output event. For the select phrase, it is possible to set "*" indicating that all properties of an input event to be inputted are specified to be properties of the output event. The from phrase is a section that specifies an input event. The where phrase is a section that specifies a condition of data to be processed. The group by phrase is a section that specifies grouping of data to be outputted. The order by phrase is a section that specifies an output order of data to be outputted. Conditions of the select phrase, the where phrase, the group by phrase, and the order by phrase are specified by a property name.

In the example of FIG. 3, the rule 1 indicates that when data of a property "1b" is greater than 100 for an event "Event1", data of all properties are extracted and outputted as an event "FilteredEvent1".

In the example of FIG. 2, the rule 2 indicates that when data of a property "2b" is smaller than 100 for an event "Event2", data of all properties are extracted and outputted as an event "FilteredEvent2".

In the rule 3, aliases are defined in the from phrase so that the event "FilteredEvent1" is "e1" and the event "FilteredEvent2" is "e2". The rule 3 indicates that when data of a property "1a" of "e1" and data of a property "2a" of "e2" are the same, each data of the property "1a" of "e1", a property "1c" of "e1", a property "2d" of "e2", and a property "2e" of "e2" are extracted. In the rule 3, it is defined that the data of the property "1a" of "e1" is the data of the property "1a" and the data of the property "1c" of "e1" is the data of the property "1c". In the rule 3, it is defined that the data of the property "2d" of "e2" is the data of the property "2d" and the data of the property "2e" of "e2" is the data of the property "2e". The rule 3 indicates that the data of the property "1a", the data of the property "1c", the data of the property "2d", and the data of the property "2e" are outputted as an event "ActionEvent".

Here, the rule 1 outputs the event "FilteredEvent1". The rule 2 outputs the event "FilteredEvent2". The rule 3 filters data from the event "FilteredEvent1" and the event "FilteredEvent2". Therefore, the rules 1 to 3 are gradual filters so that a filtering result of the rule 1 and the rule 2 is further filtered by the rule 3.

Let us return to FIG. 2. The use property information 41b is data that stores a property used for a rule. The use property information 41b is registered by a collection unit 43a described later.

FIG. 4 is a diagram illustrating an example of a data configuration of use property data. As illustrated in FIG. 4, the use property information 41b includes items of a "determination property", a "property of input event to be base of determination property", a "final output property", and a "property of input event to be base of final output property". The item of the "determination property" is an area that stores a property to be used for determination in the rule. The item of the "property of input event to be base of determination property" is an area that stores information indicating what property of what input event the determination property is. The item of the "final output property" is an area that stores a property that is finally outputted to an output destination when the property is included in the rule. If the rule includes no property that is finally outputted to an output destination, "-" indicating that there is no final output property is stored in the item of "final output property". The item of the "property of input event to be base of final output property" is an area that stores information indicating what property of what input event the property of input event to be a base of the final output property is.

In the example of FIG. 4, the rule 1 indicates that the property "1b" of the event "Event1" is used for determination. Further, the rule 1 indicates that the base of the property "1b" of the event "Event1" is the property "1b" of the event "Event1". Further, the rule 1 indicates that there is no property that is outputted to an output destination because the final output property is "-".

The rule 2 indicates that the property "2b" of the event "Event2" is used for determination. Further, the rule 2 indicates that the base of the property "2b" of the event "Event2" is the property "2b" of the event "Event2". Further, the rule 2 indicates that there is no property that is outputted to an output destination because the final output property is "-".

The rule 3 indicates that the property "1a" of the event "FilteredEvent1" and the property "2a" of the event "FilteredEvent2" are used for determination. Further, the rule 3 indicates that the base of the property "1a" of the event "FilteredEvent1" is the property "1a" of the event "Event1" and the base of the property "2a" of the event "FilteredEvent2" is the property "2a" of the event "Event2". Further, the rule 3 indicates that the properties "1a", "1c", "2d", and "2e" of the event "ActionEvent" are properties that are outputted to a final output destination. Further, the rule 3 indicates that the base of the property "1a" of the event "ActionEvent" is the property "1a" of the event "Event1" and the base of the property "1c" of the event "ActionEvent" is the property "1c" of the event "Event1". Further, the rule 3 indicates that the base of the property "2d" of the event "ActionEvent" is the property "2d" of the event "Event2" and the base of the property "2e" of the event "ActionEvent" is the property "2e" of the event "Event2".

Let us return to FIG. 2. The memory 42 is a device that temporarily stores various data. The memory 42 is a data-rewritable volatile semiconductor memory such as a random access memory (RAM) and a cache memory. For example, the memory 42 temporarily stores various data used for processing of the control unit 43.

The control unit 43 is a device that controls the data processing device 20. As the control unit 43, it is possible to employ an electronic circuit such as a central processing unit (CPU) and an micro processing unit (MPU) and an integrated circuit such as an application specific integrated circuit (ASIC) and an field programmable gate array (FPGA). The control unit 43 includes an internal memory to store programs and control data that define various processing procedures and performs various processing by using the programs and the control data. Various programs operate, so that the control unit 43 functions as various processing units. For example, in the control unit 43, the aforementioned CEP processing unit 21 operates. The CEP processing unit 21 includes a collection unit 43a, a capturing unit 43b, an event processing unit 43c, an output unit 43d, and a deletion unit 43e. Although in the present embodiment, an example is described in which the CEP processing unit 21 includes the collection unit 43a, the capturing unit 43b, the event processing unit 43c, the output unit 43d, and the deletion unit 43e, any unit may be provided separately from the CEP processing unit 21.

The collection unit 43a is a processing unit that collects properties used for filtering. The collection unit 43a collects properties used for processing of a rule from each rule of the filter condition information 41a stored in the storage unit 41. Then the collection unit 43a identifies a property of an input event that is the base of the properties used in the processing and registers the identified property in the use property information 41b.

Figure 5:
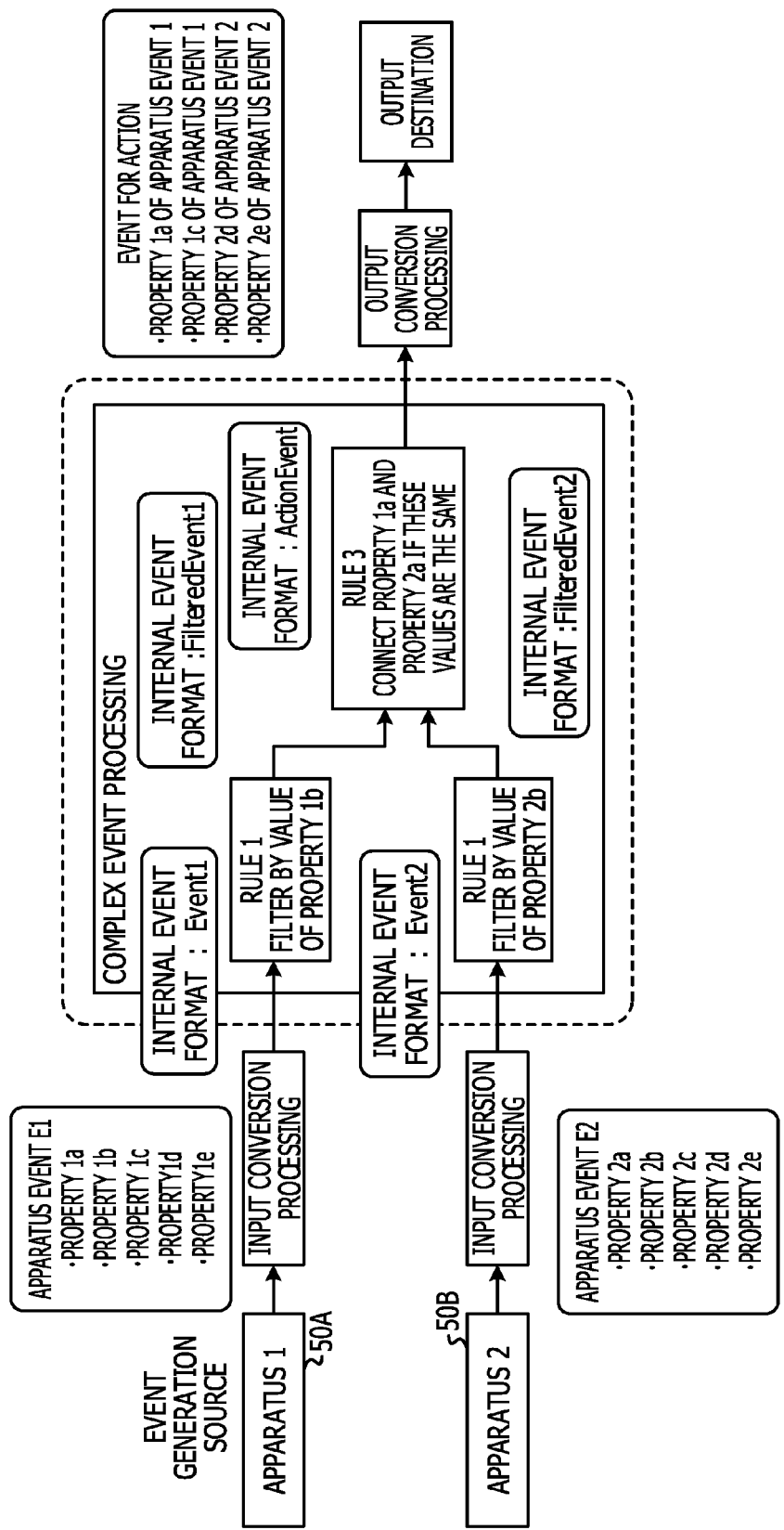
FIG. 5 is a diagram illustrating an example of a data flow of complex event processing.

Here, a flow will be described in which the collection unit 43a collects properties used for each rule from each rule of the filter condition information 41a and registers data in the use property information 41b. FIG. 5 is a diagram illustrating an example of a data flow of the complex event processing. In the example of FIG. 5, an apparatus event E1 including data of properties "1a" to "1e" is inputted from an apparatus 50A having the properties "1a" to "1e". Further, an apparatus event E2 including data of properties "2a" to "2e" is inputted from an apparatus 50B having the properties "2a" to "2e". The data processing device 20 converts the apparatus event E1 including data of the properties "1a" to "1e" inputted from the apparatus 50A into an event "Event1" and captures the event "Event1". Further, the data processing device 20 converts the apparatus event E2 including data of the properties "2a" to "2e" inputted from the apparatus 50B into an event "Event2" and captures the event "Event2". The data processing device 20 processes data of the captured event "Event1" according to the rule 1 and outputs data of an event "FilteredEvent1". Further, the data processing device 20 processes data of the captured event "Event2" according to the rule 2 and outputs data of an event "FilteredEvent2". Then, the data processing device 20 processes the data of the event "FilteredEvent1" and the data of the event "FilteredEvent2" according to the rule 3 and outputs data of an event "Action Event". The data processing device 20 performs output conversion processing on the data of the event "ActionEvent" according to an output format and outputs the converted data to an output destination as an event for action. The rules 1 to 3 are the rules illustrated in FIG. 3.

The collection unit 43a extracts an input event of each rule from the rules stored in the filter condition information 41a. Further, when an alias is defined in the input event, the collection unit 43a also extracts the alias.

FIG. 6 is a diagram for explaining a flow of extracting an input event. The collection unit 43a extracts input events from the from phrase of the rules 1 to 3. Further, the collection unit 43a extracts an alias of the input event from an alias definition of the from phrase. For example, the collection unit 43a extracts the event "Event1" as an input event for the rule 1. Further, the collection unit 43a extracts the event "Event2" as an input event for the rule 2. Further, the collection unit 43a extracts the input event "FilteredEvent1" and "FilteredEvent1" as input events for the rule 3. Further, the collection unit 43a extracts "e1" as an alias of the event "FilteredEvent1" and "e2" as an alias of the event "FilteredEvent2" for the rule 3.

Further, the collection unit 43a extracts an output event of each rule from the rules stored in the filter condition information 41a.

FIG. 7 is a diagram for explaining a flow of extracting an output event. The collection unit 43a extracts output events from the insert into phrase of the rules 1 to 3. For example, the collection unit 43a extracts the event "FilteredEvent1" as an output event for the rule 1. Further, the collection unit 43a extracts the event "FilteredEvent2" as an output event for the rule 2. Further, the collection unit 43a extracts the event "ActionEvent" as an output event for the rule 3. When there is no insert into phrase in a rule, the collection unit 43a defines an event name that does not overlap other events in order to discriminate an event outputted by the rule from the other events. For example, when there is no insert into phrase, the collection unit 43a defines an event name of the output event to be the event name of the input event+ "OutputStream" and extracts the defined event name.

Further, the collection unit 43a extracts a property to be included in an output event of each rule from the rules stored in the filter condition information 41a. Further, the collection unit 43a extracts a property that is a base of the property to be included in the output event. Further, the collection unit 43a extracts a property of an input event to be base of the property to be included in the output event.

FIG. 8 is a diagram for explaining a flow of extracting a property to be included in an output event. The collection unit 43a extracts properties from the select phrase of the rules 1 to 3. For example, when "*" is described in the select phrase, the collection unit 43a extracts all properties of the input event as properties to be included in the output event. Further, when an alias of a property to be included in the output event is defined, the collection unit 43a extracts the alias. Further, when no alias of a property to be included in the output event is defined, the collection unit 43a extracts the described property.

Further, the collection unit 43a extracts a property that is a base of the extracted property. Further, the collection unit 43a extracts a property of an input event to be base of the property to be included in the output event.

For example, "*" is set in the select phrase for the rule 1, so that the collection unit 43a extracts all properties "1a" to "1e" of the input event as properties of data of the output event. No aliases of the properties "1a" to "1e" are defined in the select phrase, so that the collection unit 43a extracts the same properties "1a" to "1e" as the base properties. Further, the collection unit 43a extracts the properties "1a" to "1e" of the event "Event1" as properties of input event that are bases of the properties "1a" to "1e".

Further, "*" is set in the select phrase for the rule 2, so that the collection unit 43a extracts all properties "2a" to "2e" of the input event as properties to be output data. No aliases of the properties "2a" to "2e" are defined in the select phrase, so that the collection unit 43a extracts the same properties "2a" to "2e" as the base properties. Further, the collection unit 43a extracts the properties "1a" to "1e" of the event "Event2" as properties of input event that are bases of the properties "2a" to "2e".

Further, the collection unit 43a extracts properties "1a", "1c", "2d", and "2e" from the select phrase as properties to be output data for the rule 3. Aliases of the properties "1a", "1c", "2d", and "2e" are defined in the select phrase. Therefore, the collection unit 43a extracts the property "1a" of "e1", the property "1c" of "e1", the property "2d" of "e2", and the property "2e" of "e2" as base properties. Further, the collection unit 43a extracts the properties "1a" and "1c" of the event "FilteredEvent1" and the properties "2d" and "2e" of the event "FilteredEvent2" as properties of input event that are bases of the properties "1a", "1c", "2d", and "2e".

The collection unit 43a identifies a correspondence relationship of properties between rules from the extracted input event and output event of each rule and properties included in the output event.

FIG. 9 is a diagram for explaining a correspondence relationship of property between rules. For example, the collection unit 43a identifies an input event, properties of the input event, properties of an output event, and the output event in each rule. Thereby, properties that are inputted but not outputted by the rule are identified. In the example of FIG. 9, an arrow is depicted when there is a property of output event corresponding to a property of input event.

The collection unit 43a extracts properties used for determination from the rules stored in the filter condition information 41a. The collection unit 43a identifies properties of input events for the properties used for determination from the correspondence relationship of properties between rules.

FIG. 10 is a diagram for explaining a flow of extracting properties used for determination. The collection unit 43a extracts properties used for determination from the where phrase of the rules 1 to 3.

For example, the collection unit 43a extracts the property "1b" as a property used for determination for the rule 1. The collection unit 43a identifies that the property "1b" is the property "1b" of the event "Event1" from the from phrase.

Further, the collection unit 43a extracts the property "2b" as a property used for determination for the rule 2. The collection unit 43a identifies the property "2b" is the property "2b" of the event "Event2" from the from phrase.

Further, the collection unit 43a extracts the property "1a" of "e1" and the property "2a" of "e2" as properties used for determination for the rule 3. The collection unit 43a identifies that the property "1a" of "e1" is the property "1a" of the event "FilteredEvent1" from the from phrase. Further, the collection unit 43a identifies that the property "2a" of "e2" is the property "2a" of the event "FilteredEvent2" from the from phrase.

The collection unit 43a identifies properties of input events corresponding to the properties used for determination from the identified correspondence relationship of properties between rules. FIG. 11 is a diagram for explaining a flow of identifying properties of input events corresponding to properties used for determination. For example, the property "1a" of the event "FilteredEvent1" is the property "1a" of the event "Event1" at the uppermost stream in the correspondence relationship. The property "2a" of the event "FilteredEvent2" is the property "2a" of the event "Event2" at the uppermost stream in the correspondence relationship. On the other hand, the property "1b" of the event "Event1" and the property "2b" of the event "Event2" are at the uppermost stage in the correspondence relationship. Therefore, the collection unit 43a identifies that the properties of input events for the properties used for determination are the properties "1a" and "1b" of the event "Event1" and the properties "2a" and "2b" of the event "Event2".

Further, the collection unit 43a extracts properties used for output from the rules stored in the filter condition information 41a. Then, the collection unit 43a identifies properties of input events to be bases of the properties of an event used for output from the correspondence relationship of properties between rules.

FIG. 12 is a diagram for explaining a flow of extracting properties used for output. The collection unit 43a extracts properties from the select phrase of the rules 1 to 3. Then, the collection unit 43a obtains properties to be included in the output event at the lowermost stream in the correspondence relationship and identifies properties of input events for the properties to be included in the output event at the lowermost stream. For example, among the properties extracted from the select phrases, the property "1a" of "e1", the property "1c" of "e1", the property "2d" of "e2", and the property "2e" of "e2" are the properties to be final outputs. These property "1a" of "e1", property "1c" of "e1", property "2d" of "e2", and property "2e" of "e2" are the properties "1a" and "1c" of the event "FilteredEvent1" and the properties "2d" and "2e" of the event "FilteredEvent2".

Figure 13:
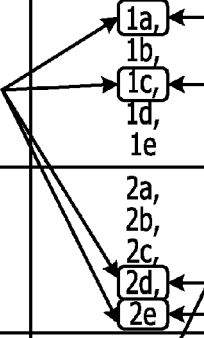
FIG. 13 is a diagram for explaining a flow of identifying properties of input events corresponding to properties used for output.

The collection unit 43a identifies properties of input events for the properties used for output from the identified correspondence relationship of properties between rules. FIG. 13 is a diagram for explaining a flow of identifying properties of input events corresponding to properties used for output. For example, the properties "1a" and "1c" of the event "FilteredEvent1" are the properties "1a" and "1c" of the event "Event1" at the uppermost stream in the correspondence relationship. The properties "2d" and "2e" of the event "FilteredEvent2" is the properties "2d" and "2e" of the event "Event2" at the uppermost stream in the correspondence relationship. Therefore, the collection unit 43a identifies that the properties of input events for the properties used for output are the properties "1a" and "1c" of the event "Event1" and the properties "2d" and "2e" of the event "Event2".

Figure 14:
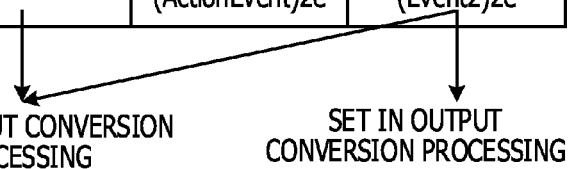
FIG. 14 is a diagram illustrating an example of use property information registered from rules 1 to 3.

The collection unit 43a registers the identified result in the use property information 41b. For example, the collection unit 43a registers a property used for determination in an item of the "determination property" and registers a property of input event to be base of the determination property in the item of the "property of input event to be base of determination property" for each rule. Further, the collection unit 43a registers a property used for output in an item of the "final output property" and registers a property of input event to be base of the final output property in the item of "property of input event to be base of final output property". Thereby, for example, the collection unit 43a registers data as illustrated in FIG. 14 from the rules 1 to 3. FIG. 14 is a diagram illustrating an example of the use property information registered from the rules 1 to 3. The use property information 41b illustrated in FIG. 14 is the same as that in FIG. 4.

The capturing unit 43b is a processing unit that performs input processing that selectively captures data of collected properties from among data of inputted event. For example, the capturing unit 43b generates input conversion processing information 60a which is a list of the properties used for determination and the final output properties from the use property information 41b for each event received from the outside. Further, the capturing unit 43b generates output conversion processing information 60b which is a list of the properties of input properties to be bases of final output properties from the use property information 41b.

Figure 15:
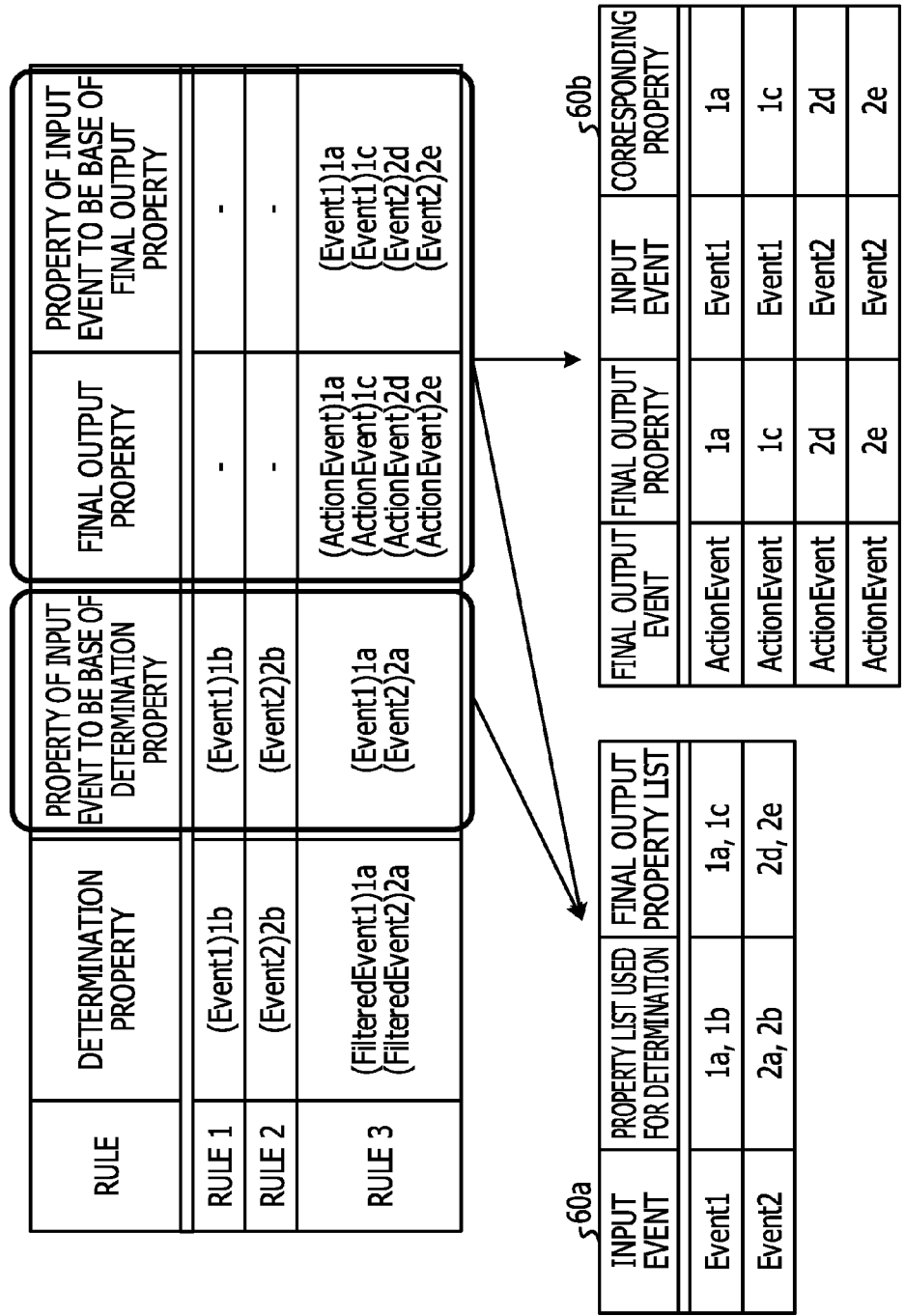
FIG. 15 is a diagram illustrating an example of input conversion processing information and output conversion processing information.

FIG. 15 is a diagram illustrating an example of input conversion processing information and output conversion processing information. As illustrated in FIG. 15, in the input conversion processing information 60a, the properties "1a" and "1b" are registered as the properties used for determination and the properties "1a" and "1c" are registered as the final output properties for the event "Event1". Further, in the input conversion processing information 60a, the properties "2a" and "2b" are registered as the properties used for determination and the properties "2d" and "2e" are registered as the final output properties for the event "Event2".

In the output conversion processing information 60b, the property "1a" of the event "Event1" is registered as a base of the property "1a" of the event "ActionEvent". Further, in the output conversion processing information 60b, the property "1c" of the event "Event1" is registered as a base of the property "1c" of the event "ActionEvent". Further, in the output conversion processing information 60b, the property "2d" of the event "Event2" is registered as a base of the property "2d" of the event "ActionEvent". Further, in the output conversion processing information 60b, the property "2e" of the event "Event2" is registered as a base of the property "2e" of the event "ActionEvent".

When the capturing unit 43b receives an event from the outside, the capturing unit 43b performs input processing that selectively captures data of collected properties from among data of the received event based on the input conversion processing information 60a and the output conversion processing information 60b. For example, the capturing unit 43b converts data of properties that are used for determination of the received event in the input conversion processing information 60a among the data of the received event into a predetermined format corresponding to the complex event processing and captures the converted data. For example, when the complex event processing corresponds to data of an Extensible Markup Language (XML) format, the capturing unit 43b converts data of properties used for determination into the XML format and captures the converted data. Further, for example, the capturing unit 43b performs input processing that selectively captures data of the event received from the outside based on the output conversion processing information 60b. For example, the capturing unit 43b gives a unique ID to data of properties registered in the output conversion processing information 60b among the data of the received event and stores the data with the unique ID in the memory 42.

Then, the capturing unit 43b outputs the data of properties which is used for determination and is converted into a predetermined format corresponding to the complex event processing and the given ID to the event processing unit 43c as data of the event.

The event processing unit 43c is a processing unit that processes an event according to the rules stored in the filter condition information 41a. For example, the event processing unit 43c processes data of events captured by the capturing unit 43b according to each rule stored in the filter condition information 41a and outputs a processing result according to the rules to the output unit 43d. The event processing unit 43c includes an ID included in a processed event in data of output of each rule. When the event processing unit 43c performs processing of each rule in stages, if data of output includes data of property that is not used for determination of rule in latter stage, the event processing unit 43c may delete the data of property that is not used.

The output unit 43d is a processing unit that performs output processing for outputting a processing result of the event processing unit 43c to an output destination. For example, when the output unit 43d outputs data of event of a processing result of the event processing unit 43c to an output destination, the output unit 43d reads actual data of property stored in the memory 42 from an ID included in the data of event. Then, the output unit 43d generates data of event including the read data of property instead of the ID and outputs the generated data of event to the output destination.

Figure 16:
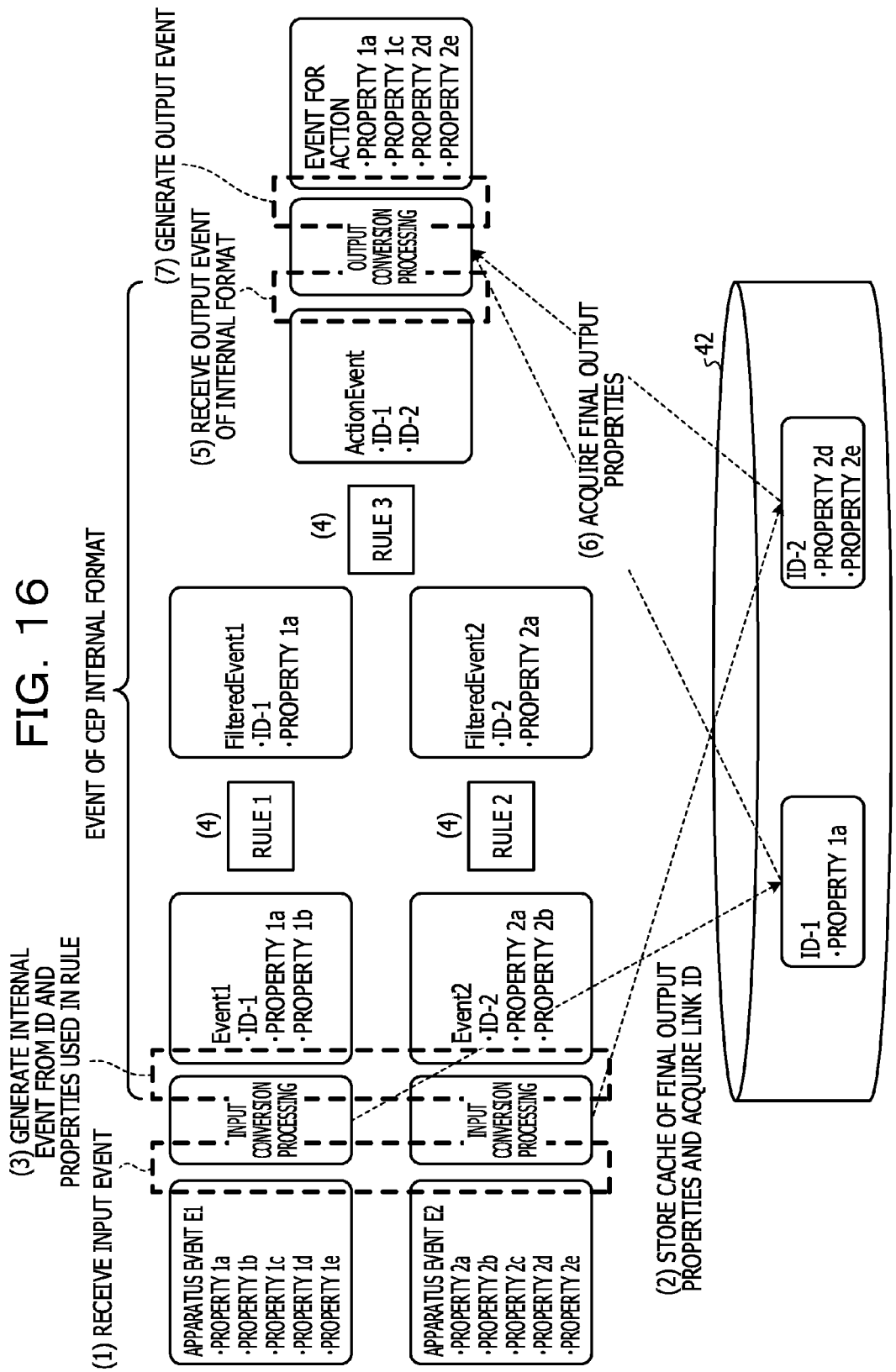
FIG. 16 is a diagram for explaining an example of a flow of the complex event processing.

Here, an example of a flow of the complex event processing by the capturing unit 43b, the event processing unit 43c, and the output unit 43d will be described. FIG. 16 is a diagram for explaining the example of the flow of the complex event processing. In the same manner as the example of FIG. 5, the example of FIG. 16 illustrates a case in which the apparatus event E1 including data of properties "1a" to "1e" and the apparatus event E2 including data of properties "2a" to "2e" are processed by the rules 1 to 3 illustrated in FIG. 3.

The apparatus event E1 and the apparatus event E2 are inputted into the capturing unit 43b and the capturing unit 43b receives the apparatus event E1 and the apparatus event E2 (FIG. 16 (1)). When the apparatus event E1 is inputted into the capturing unit 43b, the capturing unit 43b gives a unique ID-1 to data of final output properties "1a" and "1c" and stores the data in the memory 42 (FIG. 16 (2)). Then, the capturing unit 43b converts data of determination properties "1a" and "1b" into a predetermined format corresponding to the complex event processing and generates an internal event "Event1" with ID-1 (FIG. 16 (3)). Further, when the apparatus event E2 is inputted into the capturing unit 43b, the capturing unit 43b gives a unique ID-2 to data of final output properties "2d" and "2e" and stores the data in the memory 42 (FIG. 16 (2)). Then, the capturing unit 43b converts data of determination properties "2a" and "2b" into the predetermined format corresponding to the complex event processing and generates an internal event "Event2" with ID-2 (FIG. 16 (3)).

The event processing unit 43c processes the data of events captured by the capturing unit 43b according to the rules 1 to 3 and outputs a processing result according to the rule 3 (FIG. 16 (4)). In the example of FIG. 16, if data of output includes data of property that is not used for determination of rule in latter stage, the event processing unit 43c deletes the data of property that is not used. For example, in the event "FilteredEvent1" outputted from the rule 1, the property "1b" that is not used for determination of the rule 3 is deleted. However, data of property that is not used may remain without being deleted.

In this way, the capturing unit 43b selectively captures data of properties used for determination of the rules, so that it is possible to suppress resources from being consumed by storing and processing unnecessary data of property. Data of properties used for determination of the rules are captured, so that the event processing unit 43c can perform determination of the rules.

The output unit 43d receives the output event "ActionEvent" that is a processing result of the rule 3 of the last stage (FIG. 16 (5)). When the output unit 43d receives the output event "ActionEvent", the output unit 43d acquires data of final output properties "1a", "1c", "2d", and "2e" stored in the memory 42 from ID-1 and ID-2 included in the event "ActionEvent" (FIG. 16 (6)). Then, the output unit 43d generates data of event including the data of final output properties and outputs the generated data of event to an output destination as an event for action (FIG. 16 (7)).

In this way, data of properties for output are stored in the memory 42 and the data of properties are excluded from processing objects of the event processing unit 43c, so that, in the event processing unit 43c, it is possible to suppress resources from being vainly consumed by storing and processing the data of properties for output.

The deletion unit 43e is a processing unit that deletes the data of final output properties stored in the memory 42. The deletion unit 43e deletes the data of output properties stored in the memory 42 after filtering processing in stages by a plurality of rules. For example, an area of a counter whose initial value is zero is provided in an area where data of properties registered in the output conversion processing information 60b of each event are stored in the memory 42. When the event processing unit 43c starts processing of data of an event, the event processing unit 43c adds 1 to the counter in a storage area of an ID included in the data of the event. When the event processing unit 43c ends the processing of the data of the event, the event processing unit 43c subtracts 1 from the counter in the storage area of the ID included in the data of the event. Thereby, while data of an event is being processed by any one of the rules, the value of the counter is greater than zero, and while data of an event is not being processed by any one of the rules, the value of the counter is zero.

After the output unit 43d generates and outputs data of an event, the deletion unit 43e determines whether or not the value of the counter in a storage area of an ID included in the outputted event is zero, and if the value of the counter is zero, the deletion unit 43e deletes data in the storage area of the ID. Thereby, the deletion unit 43e can suppress data for which processing is completed and which is out of use from remaining in the memory 42.

Figure 17:
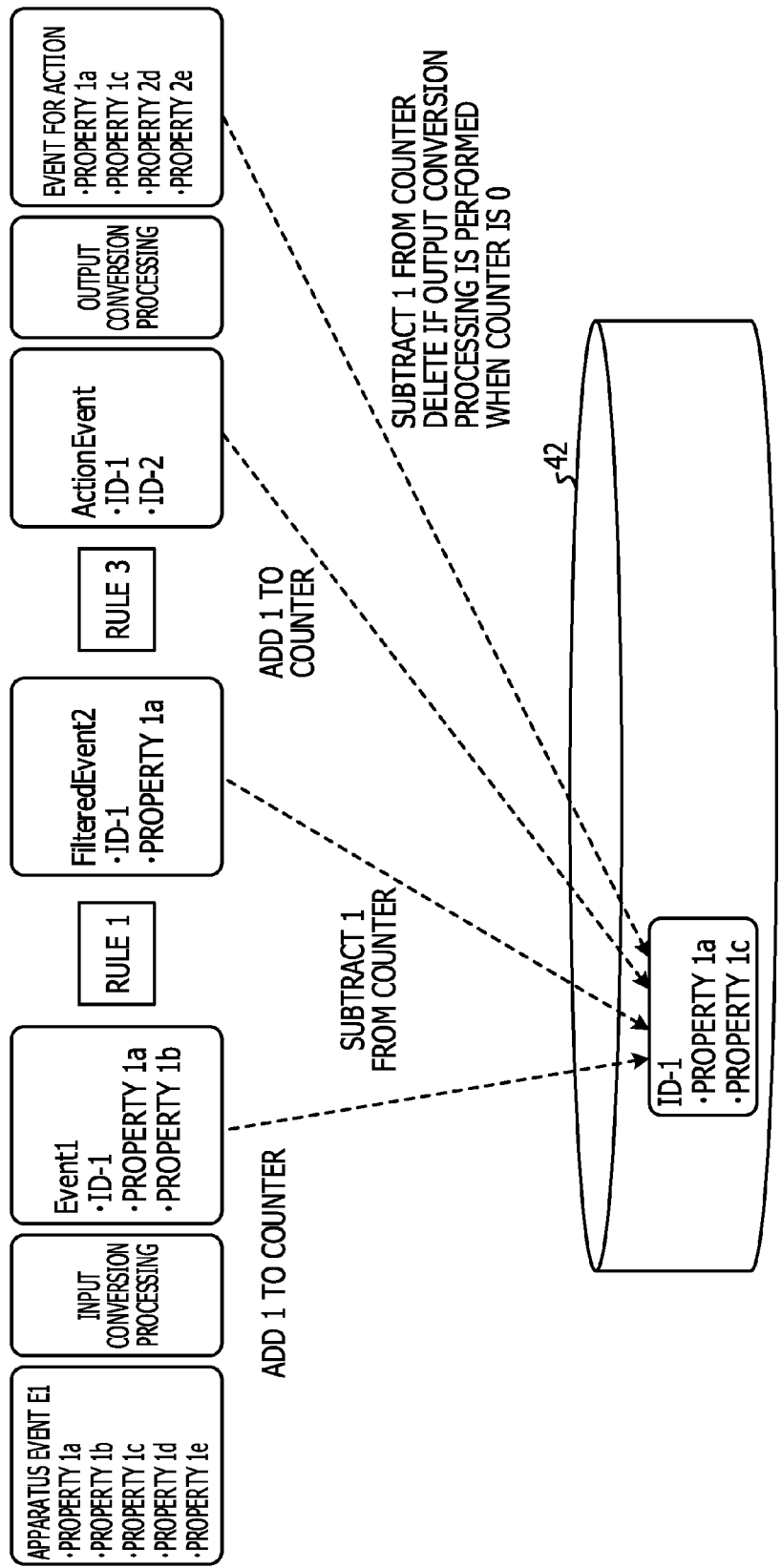
FIG. 17 is a diagram for explaining an example of a flow of deletion of data of final output properties.

Here, an example of a flow of deleting data of final output properties stored in the memory 42 will be described. FIG. 17 is a diagram for explaining an example of a flow of deletion of data of final output properties. In the same manner as the examples in FIGS. 5 and 16, the example of FIG. 17 illustrates a case in which the apparatus event E1 including data of properties "1a" to "1e" is processed by the rules 1 to 3 illustrated in FIG. 3.

When the event processing unit 43c starts processing of the event "Event1" and the event "FilteredEvent1", the event processing unit 43c adds 1 to a counter of ID-1. Further, when the event processing unit 43c ends the processing of the event "Event1" and the event "FilteredEvent1", the event processing unit 43c subtracts 1 from the counter of ID-1. After the output unit 43d completes output processing of the event "ActionEvent", if the value of the counter in a storage area of ID-1 included in the event "ActionEvent" is zero, the deletion unit 43e deletes data in the storage area of ID-1. Thereby, the deletion unit 43e can suppress data for which processing is completed and which is out of use from remaining in the memory 42.

Figure 18:
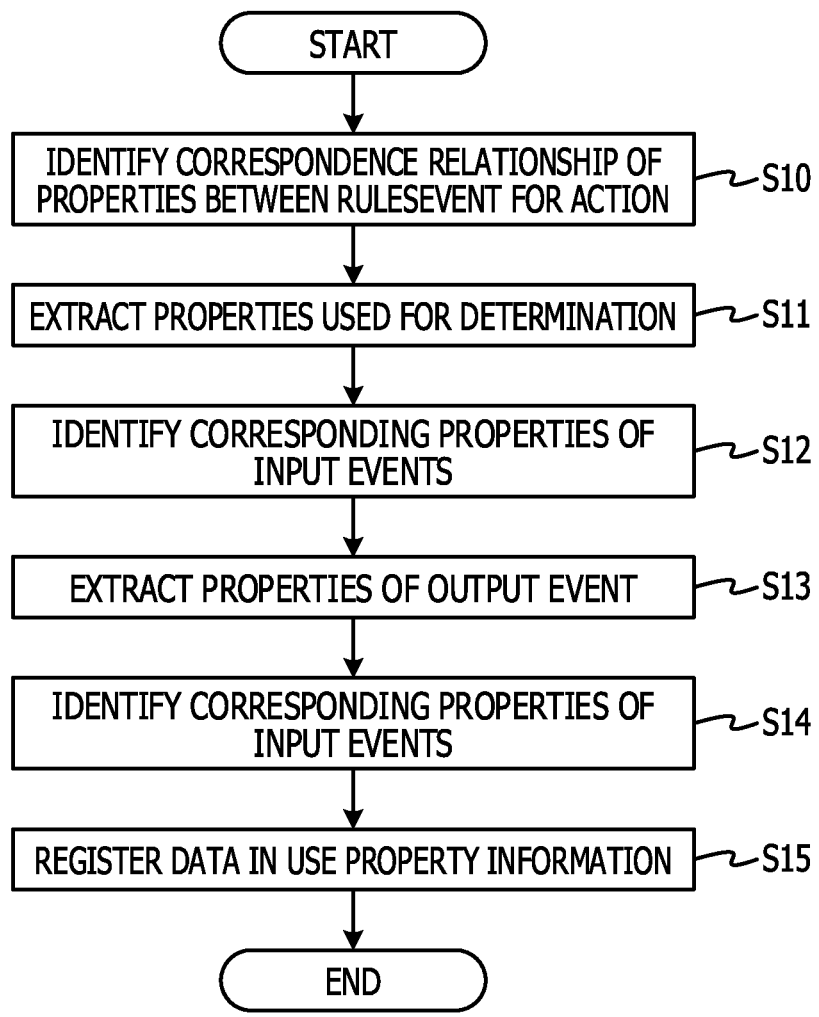
FIG. 18 is a flowchart illustrating a procedure of registration processing.

Next, a flow of various processing performed by the data processing device 20 according to the present embodiment will be described. First, a flow of registration processing will be described in which the data processing device 20 collects properties used for each rule from each rule of the filter condition information 41a and registers data in the use property information 41b. FIG. 18 is a flowchart illustrating a procedure of the registration processing. The registration processing is performed at a predetermined timing, for example, at a timing when a rule is registered.

As illustrated in FIG. 18, the collection unit 43a extracts the input event, the output event, and properties included in the output event from each rule and identifies a correspondence relationship of properties between the rules (S10). The collection unit 43a extracts properties used for determination from the rules stored in the filter condition information 41a (S11). The collection unit 43a identifies properties of the input events for the properties used for determination from the correspondence relationship of properties between the rules (S12).

Further, the collection unit 43a extracts properties used for output from the rules stored in the filter condition information 41a (S13). The collection unit 43a identifies properties of the input events to be bases of the properties of an event used for output from the correspondence relationship of properties between the rules (S14).

The collection unit 43a registers the identified properties in the use property information 41b (S15) and ends the processing.

Figure 19:
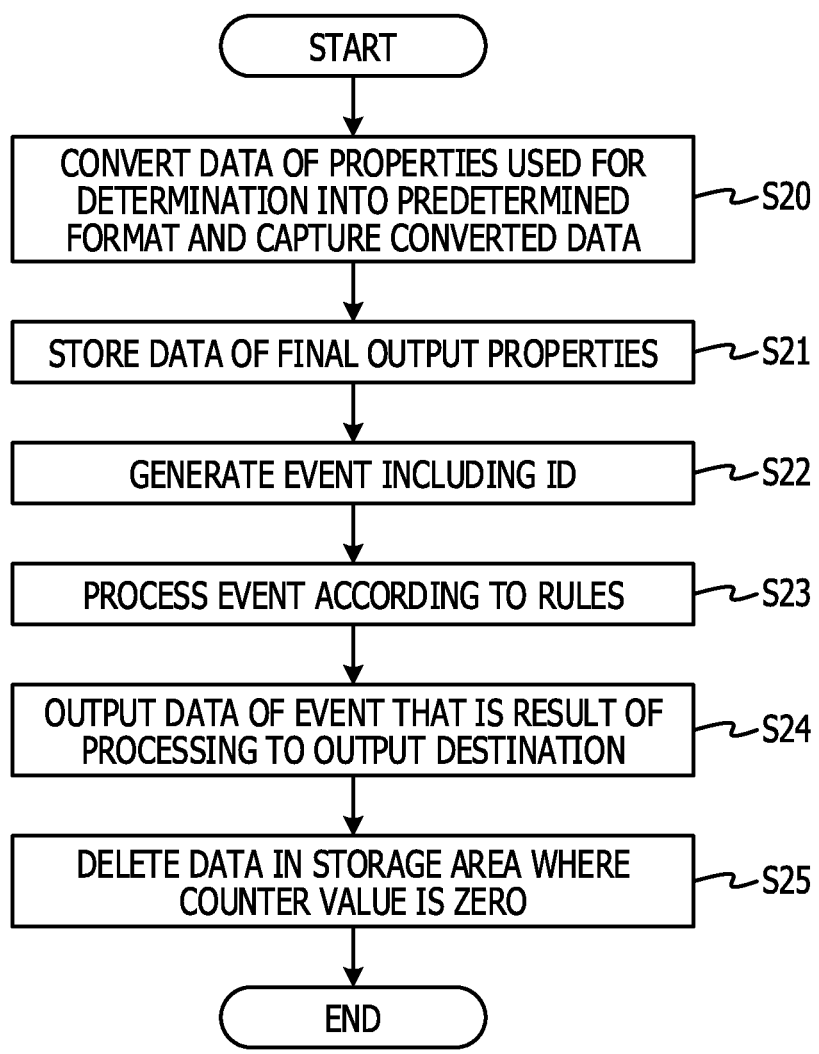
FIG. 19 is a flowchart illustrating a procedure of the complex event processing.

Next, a flow will be described in which the data processing device 20 performs the complex event processing of data of an event received from the outside. FIG. 19 is a flowchart illustrating a procedure of the complex event processing. The registration processing is performed at a predetermined timing, for example, at a timing when receiving an event from the outside.

As illustrated in FIG. 19, the capturing unit 43b converts data of properties that are used for determination of event among data of the received event into a predetermined format and captures the converted data (S20). Further, the capturing unit 43b gives a unique ID to data of final output properties among the data of the received event and stores the data with the unique ID in the memory 42 (S21). The capturing unit 43b generates an event by including the ID which the capturing unit 43b gives in data of the event (S22).

The event processing unit 43c processes the data of the generated event according to the rules stored in the filter condition information 41a (S23). In this case, when the event processing unit 43c starts processing of the data of the event, the event processing unit 43c adds 1 to a counter in a storage area of an ID included in the data of the event. When the event processing unit 43c ends the processing of the data of the event, the event processing unit 43c subtracts 1 from the counter in the storage area of the ID included in the data of the event.

The output unit 43d outputs data of an event that is a processing result of the event processing unit 43c to an output destination (S24).

The deletion unit 43e deletes data in a storage area where the value of the counter in the storage area of the ID included in the outputted event is zero (S25) and ends the processing.

In this way, the data processing device 20 collects data items used for each rule from a plurality of rules which are stored in the storage unit 41 and indicate conditions for filtering inputted data in stages. Then, the data processing device 20 selectively captures data of collected properties from among inputted data. Thereby, data of unnecessary properties are not captured, so that the data processing device 20 can suppress consumption of resources. Further, the data processing device 20 selectively captures data of properties used for each rule, so that the data processing device 20 can perform processing according to each rule. Further, by selectively capturing data of properties used for each rule, for example, when processing of the rules is distributed to a plurality of devices and processed by the devices, it is possible to reduce the amount of data of communication between the devices by not capturing data of unnecessary properties.

Further, the data processing device 20 collects determination properties used for determination in a rule and output properties outputted when satisfying the rule. Then, the data processing device 20 captures data of the determination properties from received data by converting the data of the determination properties into a predetermined format corresponding to the complex event processing and stores data of the output properties in the memory 42. In this way, the data processing device 20 can perform determination of a rule by data of minimum properties by capturing the data of the determination properties, so that it is possible to suppress consumption of resources. Further, the data processing device 20 can output data according to a rule when satisfying the rule by storing the data of the output properties in the memory 42.

Further, the data processing device 20 performs filtering in stages by a plurality of rules by using the data of the determination properties converted into a predetermined format for the received data and outputs a result of the filtering by using the data of the output properties stored in the memory 42. Thereby, the data processing device 20 can perform filtering in stages while suppressing consumption of resources.

Further, the data processing device 20 deletes the data of the output properties stored in the memory 42 after the filtering processing in stages by a plurality of rules. Thereby, the data processing device 20 can suppress the data of the output properties stored in the memory 42 from remaining.

Second Embodiment

Although the embodiment related to the disclosed device has been described, the disclosed technique may be implemented in various different forms in addition to the embodiment described above. Therefore, other embodiments included in the present disclosure will be described below.

For example, in the embodiment described above, the input conversion processing information 60a and the output conversion processing information 60b are generated from the use property information 41b. In the embodiment described above, a case is described in which the input conversion processing and the output conversion processing are performed by using the input conversion processing information 60a and the output conversion processing information 60b. However, the disclosed device is not limited to this. For example, the data processing device 20 may perform the input conversion processing and the output conversion processing by using the use property information 41b.

Each component of each device illustrated in the drawings is functional and conceptual and may be physically configured differently from the component illustrated in the drawings. In other words, specific forms of distribution and integration of the devices are not limited to those illustrated in the drawings, and all or part of the devices can be functionally or physically distributed or integrated in arbitrary units according to various loads and the state of use. For example, the processing units including the collection unit 43a, the capturing unit 43b, the event processing unit 43c, the output unit 43d, and the deletion unit 43e illustrated in FIG. 2 may be appropriately integrated. All or part of processing functions performed in each processing unit may be realized by a CPU and a program analyzed and executed by the CPU or may be realized by hardware based on wired logic.

Data Processing Program

Figure 20:
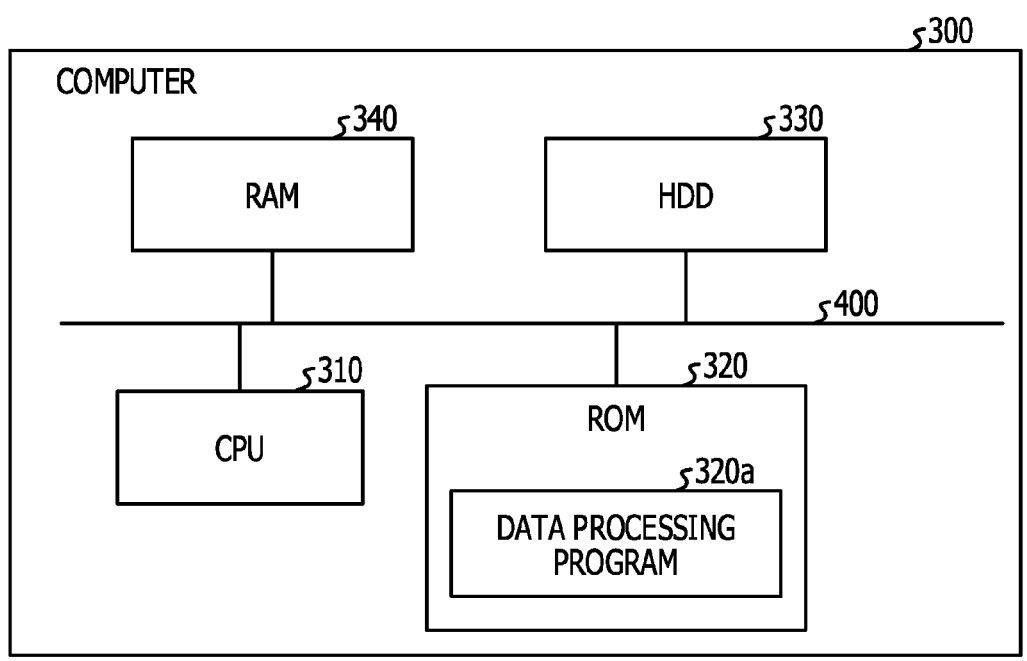
FIG. 20 is a diagram illustrating a computer executing a data processing program.

The various processing described in the above embodiment can be realized by executing a program prepared in advance by a computer system such as a personal computer or a workstation. Therefore, an example of a computer system that executes a program having the same function as that of the above embodiment will be described below. FIG. 20 is a diagram illustrating a computer executing a data processing program.

As illustrated in FIG. 20, a computer 300 includes a central processing unit (CPU) 310, a read only memory (ROM) 320, a hard disk drive (HDD) 330, and a random access memory (RAM) 340. These units 310 to 340 are connected to each other through a bus 400.

The ROM 320 stores in advance a data processing program 320a that exerts the same functions as those of each unit of the embodiment described above. For example, the data processing program 320a that exerts the same functions as those of the collection unit 43a, the capturing unit 43b, the event processing unit 43c, the output unit 43d, and the deletion unit 43e of the embodiment described above is stored. The data processing program 320a may be appropriately divided.

The CPU 310 reads and executes the data processing program 320a from the ROM 320, so that the CPU 310 performs the same operation as that of the embodiment described above. In other words, the data processing program 320a performs the same operations as those of the collection unit 43a, the capturing unit 43b, the event processing unit 43c, the output unit 43d, and the deletion unit 43e.

The data processing program 320a described above is not stored in the ROM 320 from the beginning in some cases. The data processing program 320a may be stored in the HDD 330.

For example, the program is stored in a "portable physical medium" such as a flexible disk (FD), a CD-ROM, a DVD disk, a magneto-optical disk, and an IC card, which are inserted into the computer 300. Then, the computer 300 may read the program from these media and execute the program.

Further, the program is stored in "another computer (or server)" connected to the computer 300 through a public line, the Internet, a LAN, a WAN, or the like. Then, the computer 300 may read the program from these and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium including a program, which when executed by a computer, causes the computer to execute a process, the process comprising:
    collecting data item indicating specific criteria relating to a plurality of rules for gradually filtering a received data; and
    selectively extracting specific data relating to the collected data item indicating the specific criteria from content of the received data,
    wherein the collected data item includes a determination data item used for determinations in each of the plurality of rules, and an output data item outputted when satisfies in each of the plurality of rules, and
    the selectively extracting includes converting data corresponding to the determination data item to specific format, and storing data corresponding to the output data item, and
    the process comprises:
    executing the gradually filtering the received data in accordance with the plurality of rules by the converted data corresponding to the determination data item, and
    outputting result of the executing by the stored data corresponding to the output data item.

2. The non-transitory computer-readable medium of claim 1, wherein
    the process comprises:
    deleting the stored data corresponding to the output data item after executing the gradually filtering the received data in accordance with the plurality of rules.

3. A method comprising:
    collecting data item indicating specific criteria relating to a plurality of rules for gradually filtering a received data; and
    selectively extracting specific data relating to the collected data item indicating the specific criteria from content of the received data,
    wherein the collected data item includes a determination data item used for determinations in each of the plurality of rules, and an output data item outputted when satisfies in each of the plurality of rules, and
    the selectively extracting includes converting data corresponding to the determination data item to specific format, and storing data corresponding to the output data item, and
    the method comprises:
    executing the gradually filtering the received data in accordance with the plurality of rules by the converted data corresponding to the determination data item, and
    outputting result of the executing by the stored data corresponding to the output data item.

4. An apparatus comprising:
    a memory; and
    a processor coupled to the memory and configured to execute a process, the process including:
    collecting data item indicating specific criteria relating to a plurality of rules for gradually filtering a received data; and
    selectively extracting specific data relating to the collected data item indicating the specific criteria from content of the received data,
    wherein the collected data item includes a determination data item used for determinations in each of the plurality of rules, and an output data item outputted when satisfies in each of the plurality of rules, and
    the selectively extracting includes converting data corresponding to the determination data item to specific format, and storing data corresponding to the output data item, and
    the process comprises:
    executing the gradually filtering the received data in accordance with the plurality of rules by the converted data corresponding to the determination data item, and
    outputting result of the executing by the stored data corresponding to the output data item.

* * * * *